(12) United States Patent
Walsh et al.

(10) Patent No.: US 8,358,579 B1
(45) Date of Patent: Jan. 22, 2013

(54) CONTROLLING QUALITY OF SERVICE AND CONTENT QUALITY BASED ON USER RELATIONSHIPS

(75) Inventors: Richard J. Walsh, Raleigh, NC (US); Alfredo C. Issa, Apex, NC (US); Sid Stafford, Durham, NC (US); James Evans, Apex, NC (US)

(73) Assignee: Quiro Holdings, Inc., Raleigh, NC (US)

( * ) Notice: Subject to any disclaimer, the term of this patent is extended or adjusted under 35 U.S.C. 154(b) by 1246 days.

(21) Appl. No.: 11/466,648

(22) Filed: Aug. 23, 2006

(51) Int. Cl.
*H04W 4/00* (2009.01)
*G06F 15/16* (2006.01)
*G06F 15/173* (2006.01)
*H04M 11/00* (2006.01)

(52) U.S. Cl. ........ 370/230; 370/328; 370/329; 370/330; 370/338; 709/229; 709/232; 709/238; 709/242; 455/406

(58) Field of Classification Search .................. 370/468; 709/203, 246
See application file for complete search history.

(56) References Cited

U.S. PATENT DOCUMENTS

| | | | | |
|---|---|---|---|---|
| 6,031,845 | A * | 2/2000 | Walding | 370/468 |
| 6,035,323 | A | 3/2000 | Narayen et al. | |
| 6,301,607 | B2 | 10/2001 | Barraclough et al. | |
| 7,062,107 | B1 * | 6/2006 | Crosby et al. | 382/299 |
| 7,069,308 | B2 * | 6/2006 | Abrams | 709/218 |
| 2002/0143972 | A1 | 10/2002 | Christopoulos et al. | |
| 2004/0091232 | A1 * | 5/2004 | Appling, III | 386/46 |
| 2004/0148434 | A1 * | 7/2004 | Matsubara et al. | 709/246 |
| 2005/0159998 | A1 * | 7/2005 | Buyukkokten et al. | 705/11 |
| 2005/0165726 | A1 | 7/2005 | Kawell, Jr. et al. | |
| 2005/0216300 | A1 * | 9/2005 | Appelman et al. | 705/1 |
| 2005/0229243 | A1 | 10/2005 | Svendsen et al. | |
| 2005/0246752 | A1 | 11/2005 | Liwerant et al. | |
| 2006/0259957 | A1 * | 11/2006 | Tam et al. | 726/3 |
| 2008/0040474 | A1 * | 2/2008 | Zuckerberg et al. | 709/224 |

* cited by examiner

*Primary Examiner* — Nittaya Juntima
*Assistant Examiner* — Samina Choudhry
(74) *Attorney, Agent, or Firm* — Withrow & Terranova, PLLC (57) ABSTRACT

A system and method are provided for controlling Quality of Service (QoS), content quality, or both QoS and content quality in a content sharing network based on user relationships. More specifically, QoS, content quality, or both QoS and content quality may be controlled based on a relationship of a user of a network node requesting content and either a user of a network node hosting the requested content or an owner of the requested content, a relationship between the user of the network node requesting the content and the content, or any combination thereof.

35 Claims, 9 Drawing Sheets

FIG. 1

```
<rdf:RDF
    xmlns:rdf="http://www.w3.org/1999/02/22-rdf-syntax-ns#"
    xmlns:rdfs="http://www.w3.org/2000/01/rdf-schema#"
    xmlns:foaf="http://xmlns.com/foaf/0.1/">
<foaf:Person rdf:ID="me">
    <foaf:name>Mary Smith</foaf:name>
    <foaf:title>Mrs</foaf:title>
    <foaf:givenname>Mary</foaf:givenname>
    <foaf:family_name>Smith</foaf:family_name>
    <foaf:nick>Mary</foaf:nick>
    <foaf:mbox rdf:resource="mailto:mary.smith@a.com"/>
    <foaf:homepage rdf:resource="http://www.mary.com"/>
    <foaf:depiction rdf:resource="http://www.mary.com/images/me.jpg"/>
    <foaf:phone rdf:resource="tel:800-555-1212"/>
    <foaf:workplaceHomepage rdf:resource="http://www.a.com"/>
    <foaf:knows>
        <foaf:Person>
            <foaf:name>Bob Smith</foaf:name>
            <foaf:mbox rdf:resource="mailto:bob.smith@b.com"/>
        </foaf:Person>
    </foaf:knows>
    <foaf:knows>
        <foaf:Person>
            <foaf:name>Jane Doe</foaf:name>
            <foaf:mbox rdf:resource="mailto:jane.doe@c.com"/>
        </foaf:Person>
    </foaf:knows>
</foaf:Person>
</rdf:RDF>
```

CONTROLLING QUALITY OF SERVICE AND CONTENT QUALITY BASED ON USER RELATIONSHIPS

FIELD OF THE INVENTION

The present invention relates to content sharing and more particularly relates to controlling Quality of Service (QoS), content quality, or both based on user relationships.

BACKGROUND OF THE INVENTION

As a result of the proliferation of digital images and video, numerous content sharing systems have emerged. Generally, these systems are implemented using either a Peer-to-Peer (P2P) architecture or a centrally hosted architecture. Regardless of the architecture, the sharing system enables an owner to share content with both invited and uninvited guests. However, one issue is that guests are provided the same Quality of Service (QoS) and content quality regardless of their relationship to the owner of the content. For example, a guest that is completely unknown to the content owner may receive the same QoS and content quality as the content owner's friends and family. As such, there is a need for a system and method for controlling QoS and content quality in a content sharing system based on user relationships.

SUMMARY OF THE INVENTION

The present invention provides a system and method for controlling Quality of Service (QoS), content quality, or both QoS and content quality in a content sharing network based on user relationships. More specifically, QoS, content quality, or both QoS and content quality may be controlled based on a relationship of a user of a network node requesting content and either a user of a network node hosting the requested content or an owner of the requested content, a relationship between the user of the network node requesting the content and the content, or any combination thereof.

In one embodiment, the present invention is implemented in a hybrid peer-to-peer (P2P) network including a mediating server interconnecting a number of peer nodes. When a peer node requests content hosted by another peer node, the mediating server controls the QoS provided to the requesting node, the content quality of the content provided to the requesting node, or both the QoS provided to the requesting node and the content quality of the content provided to the requesting node based on a relationship between a user of the requesting peer node and a user of the hosting peer node, a relationship of the user of the requesting node and an owner of the requested content, a relationship between the user of the requesting node and persons in the requested content or persons associated with objects or things in the requested content, or any combination thereof.

In another embodiment, the present invention is implemented in a centrally hosted content sharing network. When a requesting node requests content from a central server hosting the content, the central server controls the QoS provided to the requesting node, the content quality of the content provided to the requesting node, or both the QoS provided to the requesting node and the content quality of the content provided to the requesting node based on a relationship between a user of the requesting node and an owner of the requested content, a relationship between the user of the requesting node and persons in the requested content or persons associated with objects or things in the requested content, or both.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a system and method for controlling Quality of Service (QoS), content quality, or both QoS and content quality in a content sharing network based on user relationships. More specifically, QoS, content quality, or both QoS and content quality may be controlled based on a relationship of a user of a network node requesting content and either a user of a network node hosting the requested content or an owner of the requested content, a relationship between the user of the network node requesting the content and the content, or any combination thereof.

Figure 1:
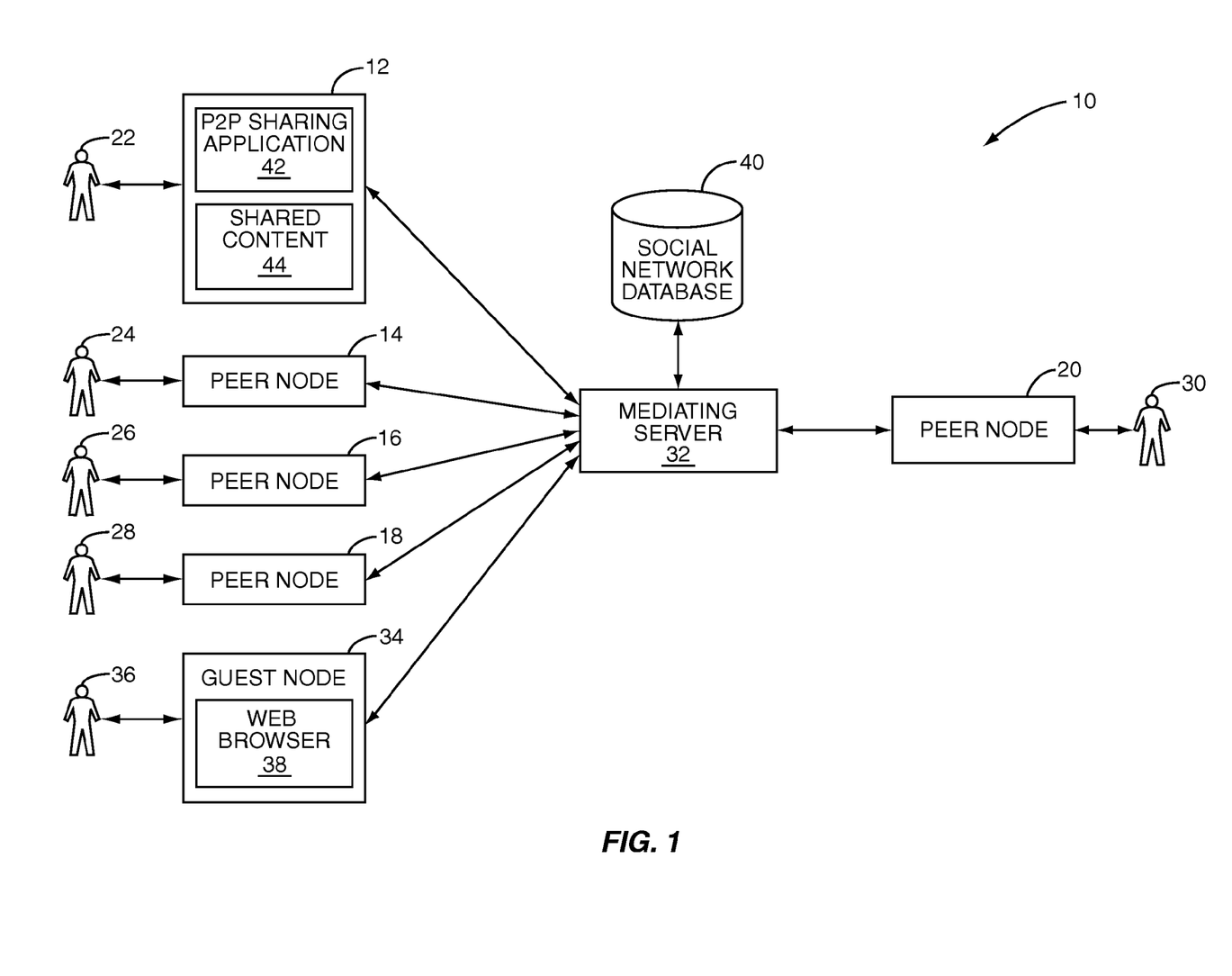
FIG. 1 illustrates an exemplary hybrid Peer-to-Peer (P2P) system including a mediating server operating to control Quality of Service (QoS), content quality, or both based on user relationships according to one embodiment of the present invention.

FIG. 1 illustrates an exemplary hybrid Peer-to-Peer (P2P) system 10 operating to control QoS, content quality, or both QoS and content quality based on user relationships according to one embodiment of the present invention. In general, the system 10 includes a number of peer nodes 12-20 having associated users 22-30 interconnected by a mediating server 32, which may also be referred to as a proxy server. A guest node 34 having an associated user 36 may also be interconnected to the peer nodes 12-20 via the mediating server 32, where the guest node 34 may use a web browser 38 to view or obtain content shared by the peer nodes 12-20. The mediating server 32 is also interconnected to a social network database 40.

Each of the peer nodes 12-20 may be, for example, a personal computer, a Personal Digital Assistant (PDA), a mobile phone, or the like having network access to the mediating server 32 via, for example, a Wide Area Network (WAN) such as the Internet or a cellular network, a Local Area Network (LAN), or a combination thereof. As illustrated, the peer node 12 includes a P2P sharing application 42 and shared content 44. Note that the discussion of peer node 12 is equally applicable to the other peer nodes 14-20. The P2P sharing application 42 is preferably implemented in software but may alternatively be implemented in hardware or a combination of software and hardware. The P2P sharing application 42 operates to share the shared content 44 with the other peer nodes 14-20 and optionally the guest node 34 and to view or obtain shared content from the other peer nodes 14-20 as desired by the user 22. The shared content 44 may be any digital content such as, for example, digital videos, digital images, and the like stored in one or more digital storage units within or associated with the peer node 12.

The mediating server 32 is a network node operating to interconnect the peer nodes 12-20. Optionally, the mediating server 32 may interconnect guest nodes, such as the guest node 34, to the peer nodes 12-20. While the mediating server 32 is illustrated as a single server, the present invention is not limited thereto. The mediating server 32 may implemented as a number of distributed servers. For more information regarding the basic operation of the mediating server 32 to interconnect the peer nodes 12-20 and the guest node 34, the interested reader is referred to U.S. Patent Application Publication No. 2005/0229243, entitled METHOD AND SYSTEM FOR PROVIDING WEB BROWSING THROUGH A FIREWALL IN A PEER TO PEER NETWORK, published on Oct. 13, 2005 and U.S. patent application Ser. No. 11/234,493, entitled SYSTEM AND METHOD FOR LOWERING PROXY BANDWIDTH UTILIZATION, filed Sep. 23, 2005, both of which are currently pending and are hereby incorporated herein by reference in their entireties.

According to the present invention, the mediating server 32 also operates to control QoS provided to the peer nodes 12-20 and the guest node 34 when content is requested from one of the peer nodes 12-20, to control a content quality of the content provided to the peer nodes 12-20 and the guest node 34 when the content is requested from one of the peer nodes 12-20, or to control both QoS and content quality provided to the peer nodes 12-20 and the guest node 34 when content is requested from one of the peer nodes 12-20. More specifically, if the user 22 at the peer node 12 requests content from the peer node 20, the mediating server 32 selects a QoS to provide to the peer node 12, a content quality for the requested content to be served to the peer node 12, or both based on a relationship between the user 22 of the peer node 12 and the user 30 of the peer node 20, a relationship between the user 22 of the peer node 12 and an owner of the requested content, a relationship between the user 22 of the peer node 12 and the requested content, or any combination thereof. The mediating server 32 determines these user relationships based on social network profiles stored in the social network database 40.

QoS may include parameters such as, for example, the amount of bandwidth allocated between the mediating server 32 and the requesting peer node or guest node for the request, a response speed provided by the mediating server 32, a position of the request in a request queue maintained by the mediating server 32, a priority assigned to a thread responsible for obtaining the requested content and/or providing the requested content to the requesting peer or guest node, and the like. In order to control QoS, the mediating server 32 may control any combination of one or more of the QoS parameters. In a similar fashion, content quality may include parameters such as encoding parameters for the requested content, file size, resolution, color depth, bit rate, and the like. The mediating server 32 may control the content quality by controlling any combination of one or more of the content quality parameters for the requested content.

The social network database 40 is communicatively coupled to the mediating server 32. In the illustrated embodiment, the social network database 40 is stored within or in association with the mediating server 32. Alternatively, the social network database 40 may be hosted and maintained by one or more third party servers or by the peer nodes 12-20. The social network database 40 operates to store a social network profile for each of the users 22-30 and 36 in the system 10 and optionally for a number of other users otherwise known to the system 10.

For each user, the user's social network profile includes user information and social network information. The user information may include information identifying the user such as, for example, the user's name, information identifying interests or hobbies of the user; behavioral information such as the current location of the user and previous locations of the user; information identifying the make, model, device type, and capabilities of the peer node associated with the user; and the like. The social network information includes information identifying other users "known" by the user. In other words, the social network information identifies other users with which the user has a relationship. The other users known to the user may be other users in the system 10. However, the present invention is not limited thereto. The other users known to the user may also include users, or persons, that are not one of the users 22-30 and 36 of the system 10. The social network information may identify the other users by, for example, the names or identifiers of the other users. In addition, the social network profile may include information categorizing the relationships between the user and the other users. For example, each of the other users known by the user may be categorized as a friend, family, acquaintance, co-worker, or the like. The social network profile may also include information identifying whether the user likes or dislikes each of the other users known by the user.

Figure 2:
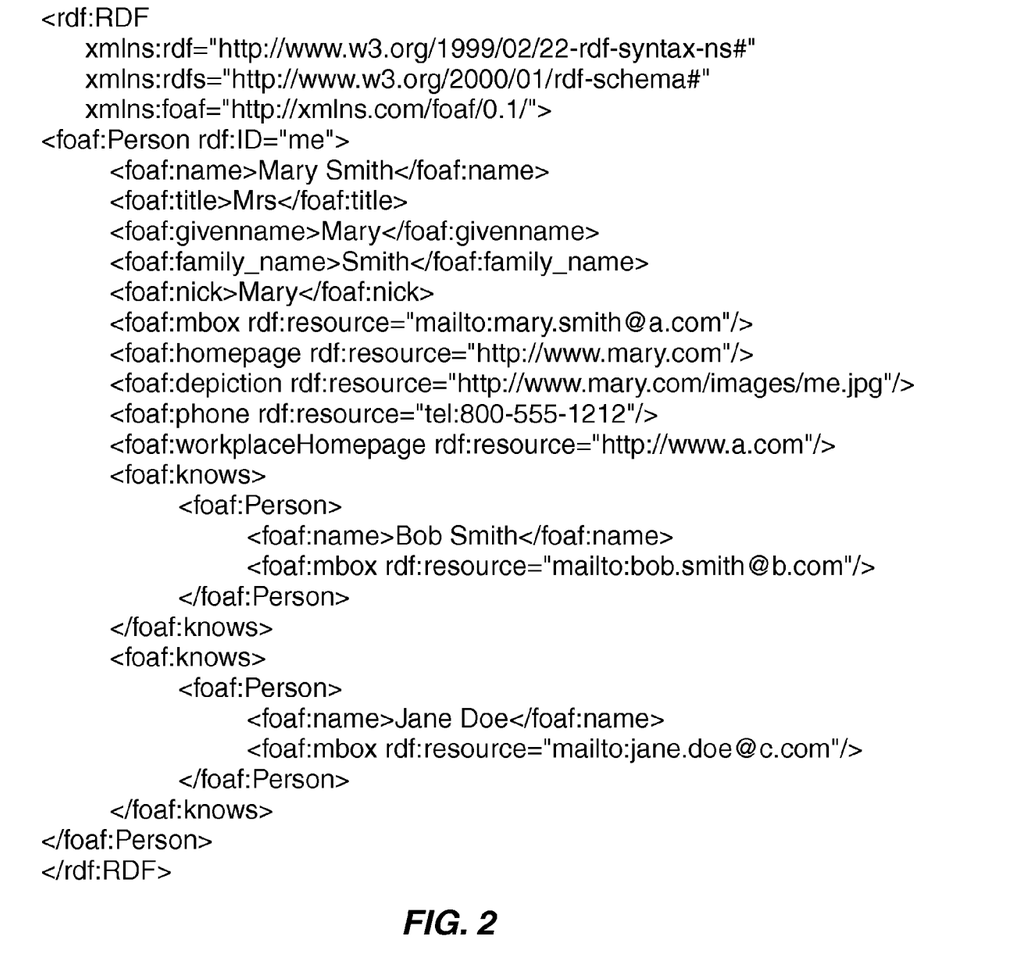
FIG. 2 illustrates an exemplary social network profile according to one embodiment of the present invention.

FIG. 2 illustrates an exemplary embodiment of a social network profile, wherein the social network profile is implemented using the Friend-of-a-Friend (FOAF) vocabulary of the Resource Description Framework (RDF) family of World Wide Web Consortium (W3C) specifications. The FOAF vocabulary is used to express social relationships between users. The illustrated example is a FOAF social network profile for a user Mary Smith. The profile provides user information including the user's name, which is Mary Smith, the user's email address, a Uniform Resource Locator (URL) to an image of the user, the user's telephone number, and a URL for the user's work homepage. The profile also includes social network information identifying other users known to Mary Smith. In this example, Mary Smith knows Bob Smith and Jane Doe. Both Bob Smith and Jane Doe may or may not be one of the users 22-30 and 36 of the system 10. In addition, for both Bob Smith and Jane Doe, the social network information includes an email address.

It should be noted that the FOAF social network profile of FIG. 2 is exemplary and not intended to limit the scope of the present invention. Other types of social network profiles or information may alternatively or additionally be used. For example, the present invention may alternatively or additionally use "buddy lists" for text or voice chat applications, contact lists from email applications, caller ID lists, phone call history information, or the like.

Figure 3:
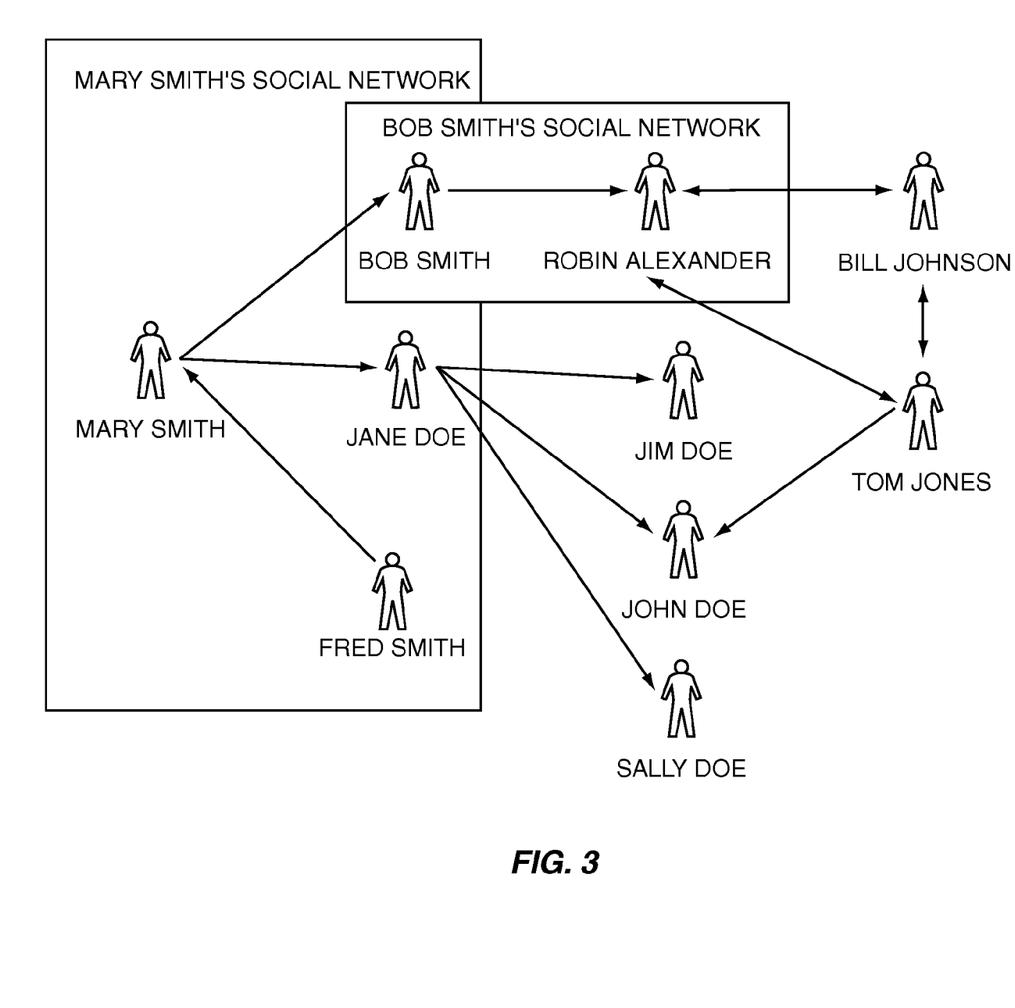
FIG. 3 illustrates an exemplary social network defined by the social network profiles of a number of users according to one embodiment of the present invention.

FIG. 3 illustrates an exemplary social network of users defined by social network profiles stored in the social network database 40. The illustrated users may include only the users 22-30 and 36 of the system 10 or both the users 22-30 and 36 of the system 10 and other users or persons that are otherwise known to the system 10. As illustrated, the social network profile of Mary Smith identifies Bob Smith and Jane Doe as other users known to Mary Smith, as indicated by the arrows pointing from Mary Smith to Bob Smith and Jane Doe. These relationships are referred to as forward relationships. Mary Smith has a reverse relationship with Fred Smith, as indicated by the arrow pointing from Fred Smith to Mary Smith. More specifically, Fred Smith's social network profile indicates that Mary Smith is known to him while Mary Smith's social network profile does not indicate that Fred Smith is known to her. Thus, Mary Smith has a reverse relationship with Fred Smith. In contrast, Fred Smith has a forward relationship with Mary Smith.

In a similar fashion, the social network profile of Bob Smith indicates that Bob Smith knows Robin Alexander. Thus, Bob Smith has a forward relationship with Robin Alexander. In a similar fashion, social network profiles of the others users illustrated in FIG. 2 define the rest of the illustrated relationships.

In this example, Mary Smith is related to all other users in the illustrated social network. More specifically, Mary Smith has first degree relationships with Bob Smith, Jane Doe, and Fred Smith; second degree relationships with Robin Alexander, Jim Doe, John Doe, and Sally Doe; and third degree relationships with Bill Johnson and Tom Jones. The first degree relationships may be referred to as direct relationships. The second and third degree relationships may generally be referred to as indirect relationships.

As discussed below in more detail, the social network profiles stored in the social network database 40 define a social network such as that illustrated in FIG. 3. The mediating server 32 uses the social network profiles to determine relationships between users associated with a request and selects a QoS, content quality, or both for the request based on the relationships.

Figure 4:
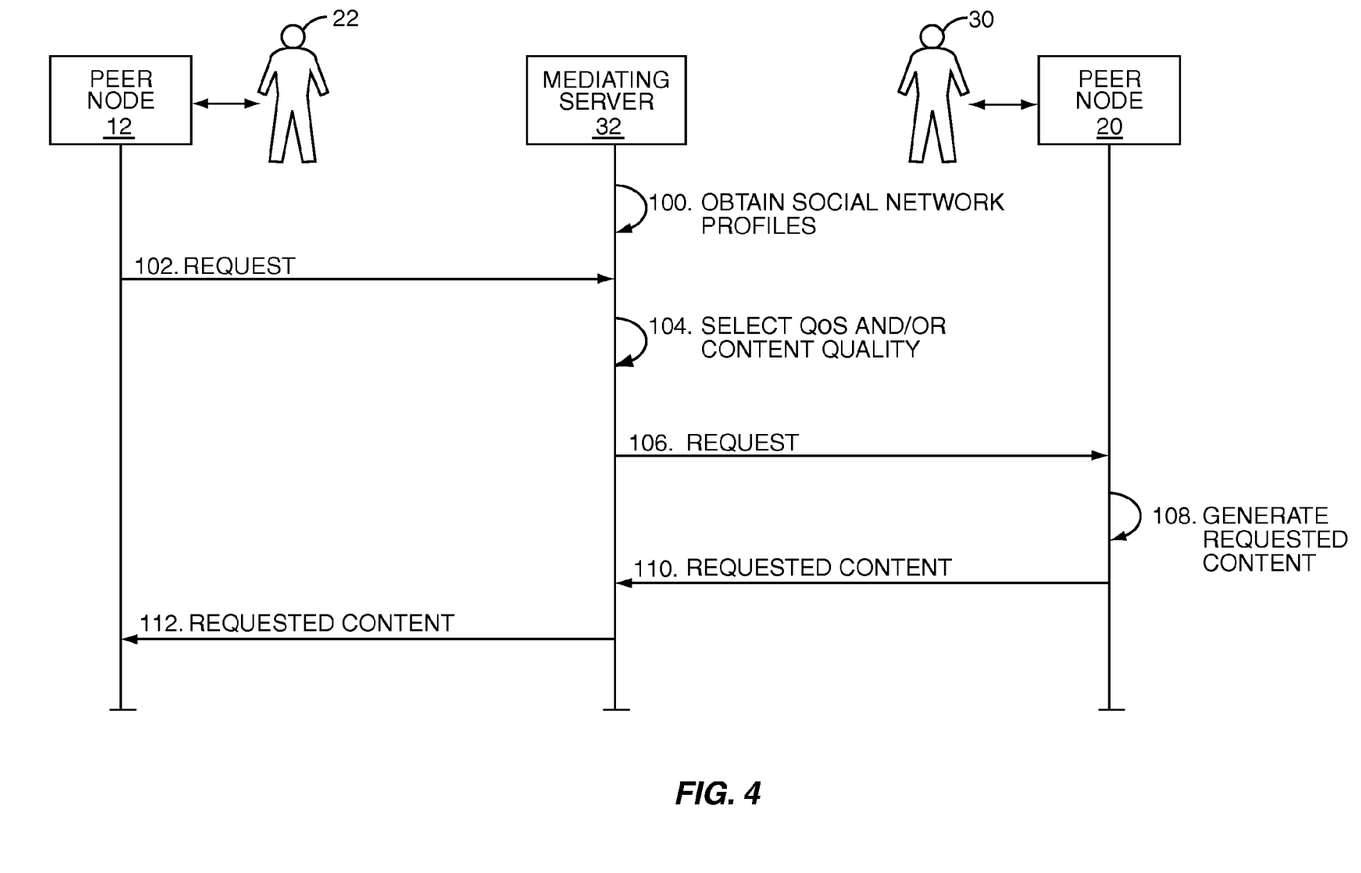
FIG. 4 illustrates the operation of the system of FIG. 1 according to one embodiment of the present invention.

More specifically, FIG. 4 illustrates the operation of the system 10 of FIG. 1 according to one embodiment of the present invention. In this example, the mediating server 32 first obtains social network profiles for the users in or otherwise known to the system 10 (step 100). The social network profiles are stored in the social network database 40. In a first embodiment, the social network profiles may be defined or generated by the corresponding users. The social network profiles may then be hosted by network nodes, such as the peer nodes 12-20 and guest node 34, associated with the users, where the social network profiles have associated URLs. The mediating server 32 or an agent of the mediating server 32 may then perform a web crawling function to obtain the social network profiles.

In a second embodiment, the social network profiles may be defined or generated by the corresponding users. The social network profiles may then be stored locally on network nodes, such as the peer nodes 12-20 and guest node 34, associated with the users or provided to one or more third party servers. The mediating server 32 may then actively obtain the social network profiles by requesting the social network profiles from the network nodes associated with the users or by requesting the social network profiles from the one or more third party servers based on identifiers of the users.

In a third embodiment, the social network profiles may be contained within messages passing through the mediating server 32, and the mediating server 32 may passively obtain the social network profiles by extracting the social network profiles from messages passing through the mediating server 32. In a similar fashion, the user profiles for users that are not part of the system 10 may be obtained by other network nodes or agents of the mediating server operating on the other network nodes.

In a fourth embodiment, the mediating sever 32 or an agent of the mediating server 32 may infer the social network profiles, or at least the social network information for the social network profiles, based on interactions between the users. For example, if the user 22 frequently requests content from the peer node 20 of the user 30, the mediating server 32 may infer that the user 22 knows the user 30. As another example, if the user 22 frequently establishes chat sessions with the user 30 via the mediating server 32, the mediating server 32 may infer that the users 22 and 30 know one another Relationships may also be inferred from history information associated with, for example, voice-over-IP applications, chat applications, instant messaging applications, and the like. In a similar fashion, the user profiles for users that are not part of the system 10 may be inferred by other network nodes or agents of the mediating server 32 operating on the other network nodes.

The examples above describe methods by which the social network profiles may be obtained and are not intended to limit the scope of the present invention. Numerous other methods of obtaining the social network profiles may be apparent to one of ordinary skill in the art upon reading this disclosure.

Next, in this example, the peer node 12 sends a request for select content to the mediating server 32 at the request of the user 22 (step 102). In response to the request, the mediating server 32 selects a QoS, a content quality, or both a QoS and a content quality for the request based on a relationship between the user 22 at the requesting peer node 12 and the user 30 at the peer node 20 hosting the requested content, a relationship between the user 22 and an owner of the requested content if the user 30 at the hosting peer node 20 is not the owner of the requested content, a relationship between the user 22 and the requested content, or any combination thereof (step 104).

More specifically, the mediating server 32 may first determine a relationship between the user 22 of the requesting peer node 12 and the user 30 of the hosting peer node 20 based on the social network profiles stored in the social network database 40. In one embodiment, the mediating server 32 may assign a score to the relationship of the user 22 of the requesting peer node 12 and the user 30 of the hosting peer node 20, as discussed below.

Additionally or alternatively, the mediating server 32 may determine a relationship between the user 22 of the requesting peer node 12 and an owner of the requested content based on the social network profiles stored in the social network database 40. If the user of the hosting peer node 20 is also the owner of the requested content, then the relationship between the user 22 and the owner is the same as the relationship between the user 22 and the user 30. However, if for example a person or user other than the user 30 of the hosting peer node 20 is the owner of the content, the mediating server 32 may determine or score the relationship between the user 22 and the owner.

Additionally or alternatively, the mediating server 32 may determine a relationship between the user 22 of the requesting peer node 12 and the requested content based on the social network profiles stored in the social network database 40. More specifically, the mediating server 32 may determine whether the user 22 of the requesting peer node 12 is the owner of the requested content. If so, the request may be assigned a high QoS and/or content quality. In addition, if the requested content is media content such as, for example, a digital video, digital image, or the like, the mediating server 32, or some third party service, may analyze the requested content to identify persons in the requested content or persons associated with objects or things in the requested content. As an example, the requested content may be a digital image or video, and an object or thing in the requested content may be a pet, where the owner of the pet may be the person associated with the requested content and may be identified by metadata associated with the requested content. The requested content may be analyzed using any known technique, as will be apparent to one of ordinary skill in the art upon reading this disclosure. For example, the mediating server 32 may identify persons in the captured content or persons associated with objects or things in the captured content using keywords or annotations stored as metadata within or in association with the digital file using video, image, or audio recognition techniques, or the like. Thereafter, the mediating server 32 may determine or score a relationship between the user 22 of the requesting peer node 12 and persons in the captured content or persons associated with objects or things in the requested content.

Then, based on the one or more user relationships or the scores thereof, the mediating server 32 selects the QoS for the connection between the mediating server 32 and the requesting peer node 12, the content quality for the content provided to the requesting peer node 12, or both. In general, the stronger the relationship, the higher the QoS and/or content quality. In one embodiment, the QoS, content quality, or both are selected based on scores computed, or generated, for one or more of the aforementioned user relationships. As discussed below in more detail, the scores for the user relationships may be generated based on the degree of relationship between the corresponding users and optionally a weighting scheme. Thresholds may then be used to select the QoS and/or content quality.

Again, QoS may include parameters such as, for example, the amount of bandwidth allocated between the mediating server 32 and the requesting peer or guest node for the request, a response speed provided by the mediating server 32, a position of the request in a request queue maintained by the mediating server 32, a priority assigned to one or more threads responsible for obtaining the requested content and/or providing the requested content to the requesting peer or guest node, and the like. Thus, for example, if the user 22 has a strong relationship with the user 30, the request may be placed at the top of the request queue maintained by the mediating server 32 or made immediately active using one or more reserved threads. In contrast, if the relationship between the user 22 and the user 30 is weak or if there is no relationship at all, then the request may be placed near the bottom or at the bottom of the request queue. Content quality may include parameters such as encoding parameters for the requested content, file size, resolution, color depth, bit rate, and the like. Thus, for example, if the user 22 has a strong relationship with the user 30, a high-quality version of the requested content may be provided to the peer node 12. Note that what is "high-quality" depends on the particular type of content, as will be apparent to one of ordinary skill in the art upon reading this disclosure.

Note that the QoS and/or content quality may be static once selected by the mediating server 32. However, the QoS and/or content quality are preferably dynamic, where the mediating sever 32 operates to dynamically adjust the QoS and/or content quality based on load conditions and the user relationships for all active and pending requests. For example, if there are a relatively small number of active and pending requests where each of the requests are from unknown guests that have no relationship to the hosting user, the owner, or the content, the mediating server 32 may relax requirements such that the QoS and/or content quality provided to the unknown guests is higher than would be provided if one or more of the requests was from a user related to the hosting user, the owner, or the content. However, if the mediating server 32 then receives one or more requests from users related to the hosting user, the owner, or the content, the mediating server 32 may dynamically reduce the QoS and/or content quality provided to the unknown guests.

Once the QoS, the content quality, or both are selected, the mediating server 32 requests the content from the hosting peer node 20 (step 106). Optionally, the request may include information identifying the QoS and/or content quality selected by the mediating server 32 such that upstream network nodes between the mediating server 32 and the hosting peer node 20, if any, and the hosting peer node 20 may proactively adapt their operation accordingly. For example, if the mediating server 32 has selected the QoS for the request such that the requested content is to be provided from the mediating server 32 to the requesting peer node 12 at 5 Kbps, then the upstream network nodes including the hosting peer node 20 may decide to adjust their operation to provide a 5 Kbps connection between the hosting peer node 20 and the mediating server 32 rather than, for example, a 10 Kbps connection.

In one embodiment, the mediating server 32 may provide information identifying the selected content quality and optionally the selected QoS to the hosting peer node 20 within a Composite Capability/Preference Profiles (CC/PP) profile. More specifically, a CC/PP profile generally includes information identifying device capabilities and user preferences of a requesting device. In response, a server may modify the requested content to provide content suitable for the requesting device or tailored to the user preferences of the user of the requesting device. Here, the mediating server 32 may modify a CC/PP profile of the requesting peer node 12 to incorporate the selected content quality and optionally the selected QoS. For example, if the requested content is a video, and the selected content quality includes parameters such as a resolution of 320×240, the mediating server 32 may modify the CC/PP profile for the requesting peer node 12 such that it appears as though the requesting peer node 12 is capable of handling, or prefers, 320×240 video.

In response to receiving the request, the hosting peer node 20 optionally generates a version of the requested content at the content quality selected by the mediating server 32 (step 108). Alternatively, the requested content may be processed by the mediating server 32 or some third party service to generate the version of the requested content at the selected content quality. In addition, the hosting peer node 20 may optionally adjust the QoS provided from the hosting peer node 12 based on the QoS selected by the mediating server 32.

The hosting peer node 20 then provides the requested content to the mediating server 32 (step 110). If not already generated by the hosting peer node 20 or some other network node, the mediating server 32 may process the requested content to generate a version of the requested content at the selected content quality. The mediating server 32 then provides the requested content at the selected content quality and QoS to the requesting peer node 12 (step 112).

In another embodiment, the mediating server 32 may provide proxy bypassing based on the user relationships, wherein a direct P2P connection is established between the requesting peer node 12 and the hosting peer node 20 for transfer of the requested content. In this case, information identifying the selected QoS and/or content quality is provided to the hosting peer node 20, and the hosting peer node 20 provides the requested content to the requesting peer node 12 according to the selected QoS and/or content quality. For more details regarding proxy bypassing, the interested reader is directed to U.S. patent application Ser. No. 11/234,493 entitled SYSTEM AND METHOD FOR LOWERING PROXY BANDWIDTH UTILIZATION, which has been incorporated herein by reference in its entirety.

Figure 5:
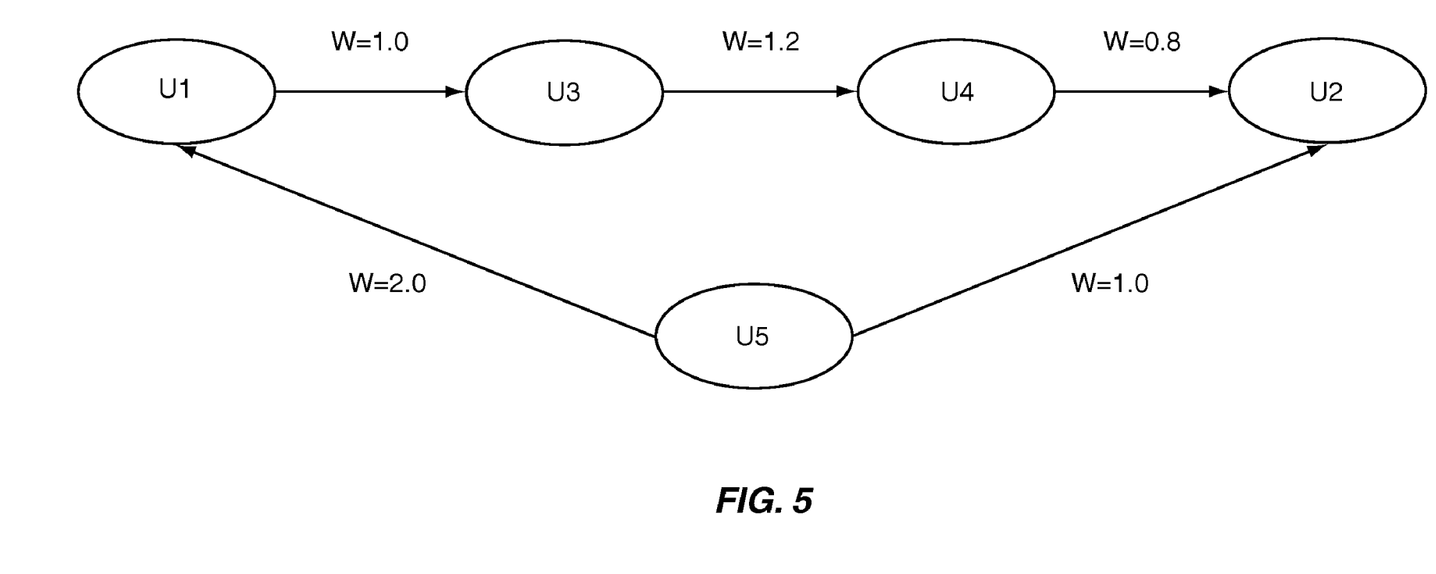
FIG. 5 illustrates a process for scoring a relationship between two users according to one embodiment of the present invention.

FIG. 5 illustrates an exemplary process for scoring a relationship between two users (U1, U2). This process may be used to score a relationship between a requesting user and a user of a peer node hosting the requested content, a relationship between a requesting user and an owner of the requested content, or a relationship between a requesting user and persons in the requested content or persons associated with objects or things in the requested content. In this example, there are two possible relationship paths between the user U1 and the user U2. First, the user U1 is related to the user U2 via users U3 and U4. Second, the user U1 is related to the user U2 via user U5. These relationships may be scored based on, for example, the following equation:

$$\text{Score} = \sum_{i=1}^{i=n} \frac{100}{i} \times \text{weight}_i,$$

where n is the number of hops or the degree of relationship between the user U1 and the user U2, i is a counter, and "weight" is a weighting factor assigned to the relationship between the two users defining the current hop. The weighting factor "weight" may also include a penalty factor for reverse relationships. For example, "weight" may include a penalty factor, where the penalty factor is 1 for forward relationships and 0.9 for reverse relationships.

Thus, in this example, the first relationship path may be scored as follows:

$$\text{Hop } U1 \to U3: \frac{100}{1} \times (1.0 \times 1.0) = 100$$

$$\text{Hop } U3 \to U4: \frac{100}{2} \times (1.2 \times 1.0) = 60$$

$$\text{Hop } U4 \to U2: \frac{100}{3} \times (0.8 \times 1.0) = 26$$

$$\text{Total Score} = 186$$

In a similar fashion, the second relationship path may be scored as follows:

$$\text{Hop } U1 \to U5: \frac{100}{1} \times (2.0 \times 0.9) = 180$$

$$\text{Hop } U5 \to U2: \frac{100}{2} \times (1.0 \times 1.0) = 50$$

$$\text{Total Score} = 230$$

Thus, the second relationship path may be selected and used to score the relationship between the users U1 and U2. Then, according to the present invention, the score may be used by the mediating server 32 to select a QoS and content quality for a corresponding request.

The weights assigned to the various relationships between the users U1-U5 may be assigned by the mediating server 32, assigned by the user associated with the peer node hosting the requested content, or derived from analyzing the social network. For example, weights may be assigned to all users based upon degree of relationship from the requesting user, the hosting user, or the owner of the content. Thus, looking at FIG. 5, the first degree relationship between the user U1 and the user U3 may be assigned a greater weight than the relationship between the user U3 and the user U4. As another example, the user may assign desired weights to individual users. As yet another example, the weights may be assigned based on the categorization of the relationships among the users. For example, a "friend" relationship may be assigned greater weight than an "acquaintance" relationship. The weights may be assigned for all content shared by a user, for groups of content shared by a user where the groups may be identified using, for example, keywords used to tag the content, or for particular content shared by a user.

In addition to considering the degree of relationship and assigned weighting factors, the scoring may also include factors such as level of centrality of a user, commonality of interests among the users, behavioral models, device models, and the like. The level of centrality of a user relates to how central the user is to the various relationship paths between two users. Thus, for example, if a particular user is within all relationship paths between two users, the relationships to and from the particular user may be assigned greater weight than relationships between other users in the relationship paths. Regarding commonality of interests, greater weight may be assigned to a relationship between two users if the users share common interests, where the interests of the users may be indicated in the social network profiles of the users. As for behavior models, the relationship between two users may be weighted based on the behavior of the two users. For example, if both of the users frequently visit a particular location, such as a restaurant, then the relationship of the two users may be assigned greater weight. Note that the peer nodes 12-20 may include Global Positioning System (GPS) receivers or the like for tracking location. Regarding the device models, the relationship between two users may be assigned greater weight if the network nodes associated with the two users are the same type of device, have the same manufacturer and model number, have the same or similar capabilities, or the like. For this, Composite Capability/Preference Profiles (CC/PP) may be used.

The scoring may also include a semantic understanding of content requested by users in a manner similar to that described in U.S. patent application Ser. No. 11/471,835, entitled GENERATING COMMUNITIES USING A MEDIATING SERVER AND THE SEMANTIC WEB, which was filed Jun. 21, 2006 and is hereby incorporated by reference in its entirety.

In addition to or as an alternative to using the scores for the relationships, the user of the peer node hosting the requested content or the owner of the requested content may define a QoS and/or content quality, or a minimum QoS and/or content quality, for a number of groups of users or for particular users. For example, the groups of users may be defined based on degree of relationship, categorization of the relationship, or both. Thus, the user may define a minimum QoS and/or content quality for a group of users defined as having a first degree relationship with the user that are also "friends" of the user.

The user of the peer node hosting shared content or owning the shared content may also override QoS and/or content quality selections made by the mediating server 32. In one embodiment, the user may be enabled to view a minimum QoS and/or content quality to be provided to particular users or all related users based on the scoring algorithm described above. The user may then override the selected QoS and/or content quality setting as desired.

It should be noted that the mediating server 32 may also operate to detect fraudulent social network profiles. More specifically, a user may generate a social network profile for himself that indicates that the user knows all other users or an abnormally large number of other users in an attempt to gain high QoS and content quality for all requests made to the peer nodes 12-20 in the system 10. As such, the mediating server 32, or an agent of the mediating server 32, may operate to identify such fraudulent social network profiles and respond appropriately.

Figure 6:
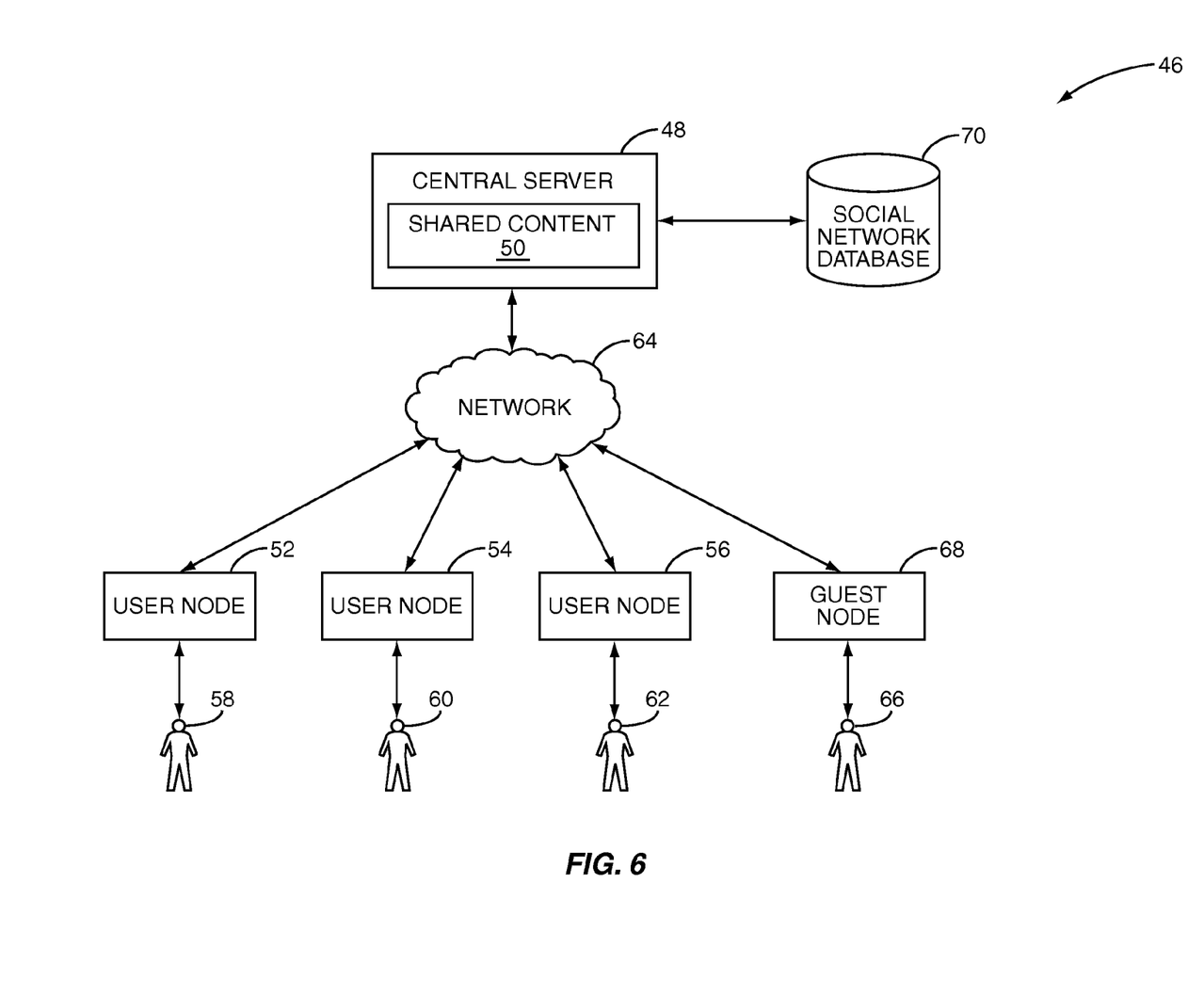
FIG. 6 illustrates an exemplary centrally hosted content sharing system including a central server operating to control Quality of Service (QoS), content quality, or both based on user relationships according to one embodiment of the present invention.

FIG. 6 illustrates an exemplary centrally hosted content sharing system 46 operating to control QoS, content quality, or both QoS and content quality based on user relationships according to a second embodiment of the present invention. In general, the system 46 includes a central server 48 hosting shared content 50 and a number of user nodes 52-56 having associated users 58-62. The central server 48 and the user nodes 52-56 are communicatively coupled by a network 64, which may be a WAN such as the Internet, a LAN, or a combination thereof.

The central server 48 may be implemented as a single network server or a number of distributed servers operating in a collaborative fashion. The shared content 50 hosted by the central server 48 may be, for example, videos, images, or the like and is uploaded to the central server 48 from the user nodes 52-56. The central server 48 may then enable users such as the users 58-62 and a user 66 of a guest node 68 to view or download the shared content 50.

According to the present invention, the central server 48 controls a QoS, content quality, or both QoS and content quality for requests for shared content from the user nodes 52-56 and the guest node 68 based on one or more user relationships. The central server 48 may consider a relationship between the user requesting content and the owner of the content, a relationship between the user requesting the content and the requested content, or both. In a manner similar to that described above with respect to the mediating server 32 of FIG. 1, the central server 48 may determine these relationships using a social network database 70. The social network database 70 is essentially the same as the social network database 40 of FIG. 1. The social network database 70 stores social network profiles for each of users 58-62 and 66 in the system 46 and optionally for each of a number of users otherwise known to the system 46.

Each of the user nodes 52-56 may be, for example, a personal computer, PDA, mobile telephone, or the like. When the user 58 of the user node 52 desires to share content with other users, the user 58 instructs the user node 52 to upload the content to the central server 48. The user 58 may then verbally invite other users such as the users 60, 62, and 66 to view or download the shared content, send an electronic invitation such as an e-mail invitation to other users inviting them to view or download the shared content, instruct the central server 48 to send an electronic invitation such as an e-mail to other users inviting them to view or download the shared content, or the like.

Figure 7:
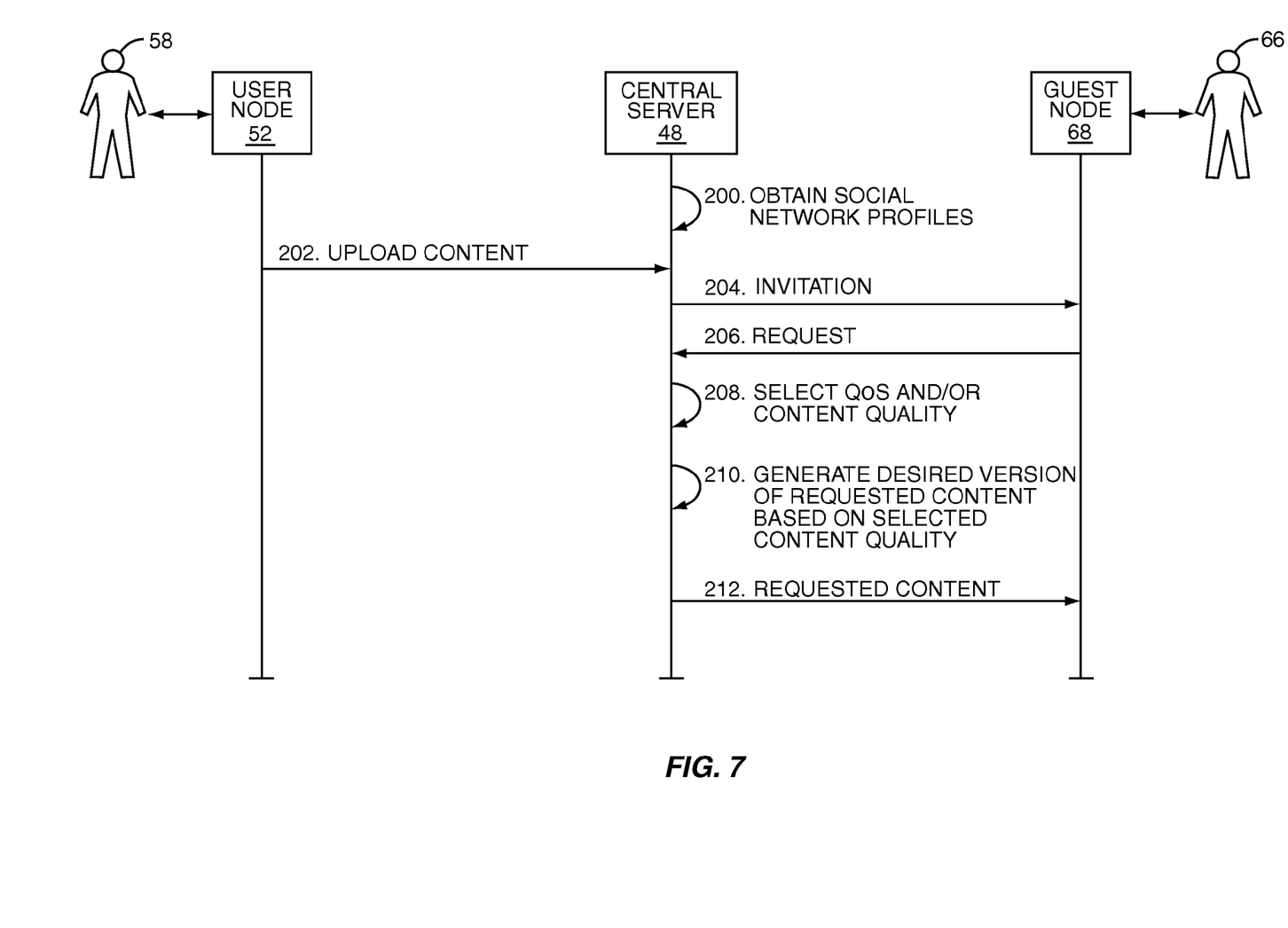
FIG. 7 illustrates the operation of the system of FIG. 6 according to one embodiment of the present invention.

FIG. 7 illustrates the operation of the system 46 of FIG. 6 according to one embodiment of the present invention. First, in this example, the central server 48 obtains social network profiles for the users in or otherwise known to the system 46 (step 200). The social network profiles are stored in the social network database 70. In a first embodiment, the social network profiles may be defined or generated by the corresponding users. The social network profiles may then be hosted by network nodes, such as the network nodes 52-56 and 68, associated with the users, where the social network profiles have associated URLs. The central server 48 or an agent of the central server 48 may then perform a web crawling function to obtain the social network profiles.

In a second embodiment, the social network profiles may be defined or generated by the corresponding users. The social network profiles may then be stored locally on network nodes, such as the network nodes 52-56 and 68, associated with the users or provided to one or more third party servers. The central server 48 may then actively obtain the social network profiles by requesting the social network profiles from the network nodes associated with the users or by requesting the social network profiles from the one or more third party servers based on identifiers of the users.

In a third embodiment, the social network profiles may be contained within messages sent to the central server 48, and the central server 48 may obtain the social network profiles by extracting the social network profiles from messages sent to the central server 48. In a similar fashion, the user profiles for the users may be passively obtained by other network nodes or agents of the central server 48 operating on the other network nodes as messages containing the user profiles pass through the other network nodes.

In a fourth embodiment, the central server 48 or an agent of the central server 48 may infer the social network profiles, or at least the social network information for the social network profiles, based on interactions between the users. For example, if the user 58 frequently requests content owned by the user 60, the central server 48 may infer that the user 58 knows the user 60. As another example, if the user 58 frequently establishes chat sessions with the user 60 via the central server 48, the central server 48 may infer that the users 58 and 60 know one another. In a similar fashion, the user profiles for users that are not part of the system 46 may be inferred by other network nodes or agents of the central server 48 operating on the other network nodes.

In this example, the user 58 of the user node 52 interacts with the user node 52 such that content desired to be shared is uploaded to the central server 48 (step 202). Optionally, the central server 48, at the request of the user 58, may send an electronic invitation to the user 66 at the guest node 68 (step 204). Note that the invitation may be used to infer a relationship between the two users. The electronic invitation may include, for example, a URL enabling the user 66 at the guest node 68 to view the content shared by the user 58. The URL may optionally contain information defining the desired QoS and content quality such that the central server 48 does not need to determine the QoS and content quality to be provided each time the associated content is requested. Alternatively, the URL may optionally include an identifier (ID) used to directly or indirectly identify the desired QoS and content quality.

If the user 66 desires to view the content, the guest node 68 sends a request for the shared content to the central server 48 (step 206). In response, the central server 48 selects a QoS for serving the request, a content quality for the content to be provided to the guest node 68, or both based on one or more user relationships (step 208). More specifically, the central server 48 may determine a relationship between the user 66 of the requesting guest node 68 and the user 58, or owner, of the requested content. In one embodiment, the central server 48 may assign a score to the relationship of the user 66 and the user 58.

Additionally or alternatively, the central server 48 may determine a relationship between the user 66 of the requesting guest node 68 and the requested content. In order to determine the relationship between the user 66 and the requested content, the central server 48 may determine whether the user 66 is the owner of the requested content. If so, the request may be assigned a high QoS and/or content quality. In addition, if the requested content is media content such as, for example, a digital video, digital image, or the like, the central server 48, or some third party service, may analyze the requested content to identify persons in the requested content or persons associated with objects or things in the requested content. The requested content may be analyzed using any known technique, as will be apparent to one of ordinary skill in the art upon reading this disclosure. For example, the central server 48 may identify persons in the captured content or persons associated with objects or things in the requested content using keywords or annotations stored as metadata within or in association with the digital file using video, image, or audio recognition techniques, or the like. Thereafter, the central server 48 may determine or score a relationship between the user 66 and persons in the captured content or persons associated with objects or things in the requested content.

Then, based on the relationship between the user 66 at the requesting guest node 68 and the user 58, the relationship between the user 68 and the requested content, or both, the mediating server 32 selects the QoS to provide for serving the requested content to the requesting guest node 68, the content quality for the content provided to the requesting guest node 68, or both. In general, as discussed above, the stronger the relationship, the higher the QoS and/or content quality. Note that the QoS and/or content quality may be static once determined. However, the QoS and/or content quality are preferably dynamic, where the mediating sever 32 operates to dynamically adjust the QoS and/or content quality based on load conditions and the user relationships for all active and pending requests.

Once the QoS, the content quality, or both are selected, the central server 48 generates the requested content according to the selected content quality (step 210). Alternatively, the central server 48 may generate multiple versions of the shared content prior to receiving requests for the content. For example, the central server 48 may generate high, medium, and low quality versions of the content. Then, based on the selected content quality, either the high, medium, or low quality version of the content is provided to the requesting node. The central server 48 then provides the requested content to the requesting guest node 68 according to the selected QoS (step 212).

It should be noted that the central server 48 may also operate to detect fraudulent social network profiles. More specifically, a user may generate a social network profile for himself that indicates that the user knows all other users or an abnormally large number of other users in an attempt to gain high QoS and content quality for all requests sent to the central server 48. As such, the central server 48, or an agent of the central server 48, may operate to identify such fraudulent social network profiles and respond appropriately.

Figure 8:
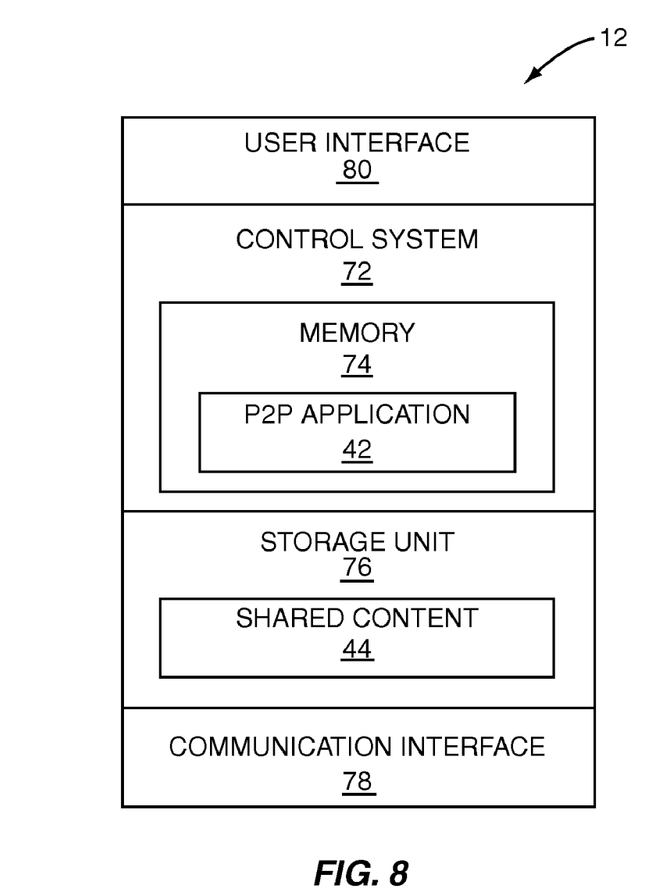
FIG. 8 is a block diagram of an exemplary peer node of FIG. 1 according to one embodiment of the present invention.

FIG. 8 is a block diagram of an exemplary embodiment of the peer node 12 of FIG. 1 according to one embodiment of the present invention. Note that this discussion of the peer node 12 is equally applicable to the other peer nodes 14-20. In general, the peer node 12 includes a control system 72 having associated memory 74. In this example, the P2P sharing application 42 is implemented as software and stored in the memory 74. However, the P2P sharing application 42 may alternatively be implemented as hardware or a combination of hardware and software. The peer node 12 also includes a storage unit 76 operating to store the shared content 44. The storage unit 76 may be any digital storage device such as, for example, a hard-disc drive, an optical storage device, memory, a removable memory device, or the like. Alternatively, the shared content 44 may be stored in the memory 74. The peer node 12 also includes a communication interface 78 operating to communicatively couple the peer node 12 to the mediating server 32. For example, the communication interface 78 may provide either a wired or wireless network connection to the mediating server 32. The peer node 12 also includes a user interface 80 for interacting with the user 22. The user interface 80 may include components such as, for example, a display, one or more user input devices, a speaker, and the like.

Figure 9:
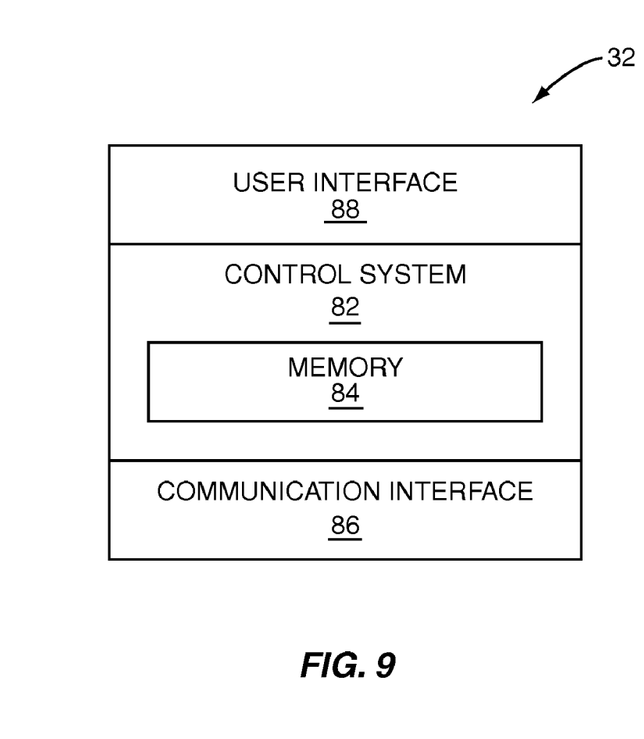
FIG. 9 is a block diagram of the mediating server of FIG. 1 according to one embodiment of the present invention.

FIG. 9 is a block diagram of an exemplary embodiment of the mediating server 32 of FIG. 1 according to one embodiment of the present invention. In general, the mediating server 32 includes a control system 82 having associated memory 84. The memory 84 includes software instructing the mediating server 32 to operate according to the present invention. The mediating server 32 also includes a communication interface 86 operating to communicatively couple the mediating server 32 to the peer nodes 12-20 and the guest node 34 via a network. The mediating server 32 may also include a user interface 88.

Figure 10:
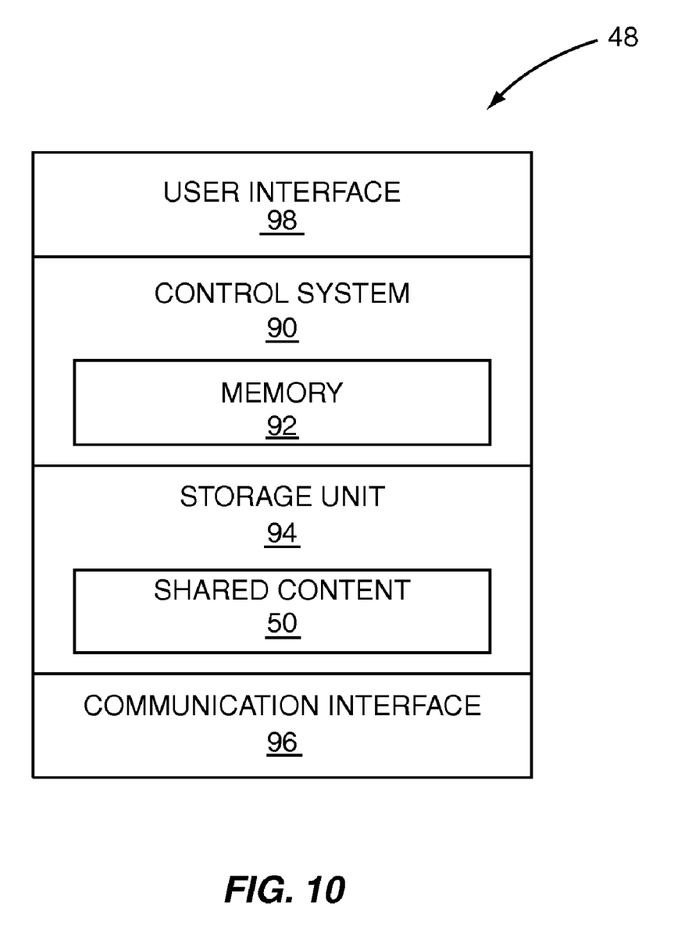
FIG. 10 is a block diagram of the central server of FIG. 6 according to one embodiment of the present invention.

FIG. 10 is a block diagram of the central server 48 of FIG. 6 according to one embodiment of the present invention. In general, the central server 48 includes a control system 90 having associated memory 92. The memory 92 includes software instructing the central server 48 to operate according to the present invention. The central server 48 also includes a storage unit 94 operating to store the shared content 50. The storage unit 94 may be any digital storage devices such as, for example, a hard-disc drive, an optical storage device, memory, a removable memory device, or the like. Alternatively, the shared content 50 may be stored in the memory 92. The central server 48 also includes a communication interface 96 operating to communicatively couple the central server 48 to the user nodes 52-56 and the guest node 68 via the network 64. The central server 48 may also include a user interface 98.

Those skilled in the art will recognize improvements and modifications to the preferred embodiments of the present invention. All such improvements and modifications are considered within the scope of the concepts disclosed herein and the claims that follow.

What is claimed is:
1. A method comprising:
  receiving, by a server, a request for content from a requesting network node associated with a requesting user;
  selecting, by the server, at least one content quality parameter for serving the request based on a social relationship of the requesting user and a person making the requested content available for distribution, the at least one content quality parameter defining a quality of the requested content to be transferred to the requesting network node and being selected from a group consisting of: an encoding algorithm used to encode the requested content, at least one encoding parameter, file size, resolution, color depth, and bit rate; and effecting transfer of the requested content to the requesting network node according to the at least one content quality parameter.

2. The method of claim 1 further comprising selecting at least one Quality of Service (QoS) parameter based on the social relationship of the requesting user and the person making the requested content available for distribution.

3. The method of claim 2 wherein selecting the at least one QoS parameter comprises selecting at least one parameter selected from a group consisting of: bandwidth allocated for serving the request, a response speed, a position of the request in a request queue, and a priority assigned to a thread allocated for processing the request; and wherein effecting transfer of the requested content to the requesting network node according to the at least one content quality parameter comprises effecting transfer of the requested content to the requesting network node according to the at least one content quality parameter and the at least one QoS parameter.

4. The method of claim 1 further comprising generating a desired version of the requested content based on the at least one content quality parameter, wherein effecting transfer of the requested content comprises effecting transfer of the desired version of the requested content.

5. The method of claim 1 wherein the person making the requested content available is an owner of the requested content and selecting the at least one content quality parameter for serving the request comprises selecting the at least one content quality parameter for serving the request based on a social relationship of the requesting user and the owner of the requested content.

6. The method of claim 1 wherein the requested content is hosted by a peer node in a Peer-to-Peer (P2P) network, the person making the requested content available for distribution is a user of a peer node, and selecting the at least one content quality parameter for serving the request comprises selecting the at least one content quality parameter for serving the request based on a social relationship of the requesting user and the user of the peer node.

7. The method of claim 1 wherein the requested content is media content, the person making the requested content available for distribution is a person depicted in the requested content, and selecting the at least one content quality parameter for serving the request comprises selecting the at least one content quality parameter for serving the request based on a social relationship of the requesting user and the person depicted in the requested content.

8. The method of claim 1 wherein the requested content is media content, the person making the requested content available for distribution is a person associated with a thing captured within the media content, and selecting the at least one content quality parameter for serving the request comprises selecting the at least one content quality parameter for serving the request based on a social relationship of the requesting user and the person associated with the thing captured within the requested content.

9. The method of claim 1 further comprising determining the social relationship of the requesting user and the person making the requested content available for distribution based on social network profiles for a plurality of users including the requesting user and the person making the requested content available for distribution.

10. The method of claim 9 wherein the social network profile for each one of the plurality of users identifies at least one other user from the plurality of users known by the one of the plurality of users.

11. The method of claim 10 wherein selecting the at least one content quality parameter comprises:
identifying a social relationship path directly or indirectly linking the requesting user and the person making the requested content available for distribution using the social network profiles for the plurality of users;
scoring the relationship based on the identified social relationship path; and
selecting the at least one content quality parameter based on the score of the identified social relationship path.

12. The method of claim 11 wherein scoring the social relationship comprises scoring the social relationship based on a degree of the social relationship between the requesting user and the person making the requested content available for distribution, as indicated by the identified social relationship path.

13. The method of claim 11 wherein the identified social relationship path comprises a series of social relationships between a number of the plurality of users linking the requesting user to the person making the requested content available for distribution, and scoring the social relationship comprises scoring each of the series of social relationships and combining the scores for the series of social relationships.

14. The method of claim 13 wherein scoring the each of the series of social relationships further comprises assigning weights to the series of social relationships.

15. The method of claim 14 wherein assigning the weights to the series of social relationships comprises assigning the weights to the series of social relationships based on a categorization of the each of the series of social relationships.

16. The method of claim 15 wherein the categorization of the each of the series of social relationships is a user defined categorization.

17. The method of claim 1 wherein receiving the request comprises receiving the request at a mediating server interconnecting a plurality of peer nodes in a Peer-to-Peer (P2P) network, and effecting transfer of the requested content to the requesting network node comprises:
providing a request for the requested content to a one of the plurality of peer nodes hosting the requested content;
receiving the requested content from the one of the plurality of peer nodes; and
providing the requested content to the requesting network node based on the at least one content quality parameter.

18. The method of claim 17 further comprising selecting at least one Quality of Service (QoS) parameter defining a QoS provided by the mediating server for the request.

19. The method of claim 17 further comprising:
providing the at least one content quality parameter to the one of the plurality of peer nodes hosting the requested content;
wherein the peer node provides the requested content to the mediating server according to the at least one content quality parameter.

20. The method of claim 17 wherein providing the requested content to the requesting network node comprises:
generating a desired version of the requested content at the mediating server according to the at least one content quality parameter; and
providing the desired version of the requested content to the requesting network node.

21. The method of claim 17 further comprising selecting at least one Quality of Service (QoS) parameter, and wherein effecting transfer of the requested content to the requesting network node further comprises providing the at least one QoS parameter to at least one of a plurality of upstream network nodes comprising a peer node hosting the requested content, wherein the at least one of the plurality of upstream network nodes proactively control a provided QoS based on the at least one QoS parameter.

22. The method of claim 1 wherein receiving the request comprises receiving the request at a central server of a centrally hosted content sharing network and effecting transfer of the requested content comprises transferring the requested content from the central server to the requesting network node.

23. The method of claim 22 further comprising selecting at least one Quality of Service (QoS) parameter provided by the central server for the request.

24. A mediating server interconnecting a plurality of peer nodes to form a Peer-to-Peer (P2P) content sharing network comprising:
   a communication interface communicatively coupling the mediating server to the plurality of peer nodes; and
   a control system associated with the communication interface and adapted to:
      receive a request for content from a requesting network node associated with a requesting user;
      select at least one content quality parameter for serving the request based on a social relationship of the requesting user and a person making the requested content available for distribution, the at least one content quality parameter defining a quality of the requested content to be transferred to the requesting network node and being selected from a group consisting of: an encoding algorithm used to encode the requested content, at least one encoding parameter, file size, resolution, color depth, and bit rate; and
      effect transfer of the requested content from a one of the plurality of peer nodes hosting the requested content to the requesting network node according to the at least one content quality parameter.

25. The mediating server of claim 24 wherein the control system is further adapted to select at least one Quality of Service (QoS) parameter based on the social relationship of the requesting user and the person making the requested content available for distribution.

26. The mediating server of claim 24 wherein the person making the requested content available for distribution is an owner of the content.

27. The mediating server of claim 24 wherein the person making the requested content available for distribution is a user of the one of the plurality of peer nodes hosting the requested content.

28. The mediating server of claim 24 wherein the requested content is media content and the person making the requested content available for distribution is a person captured within the media content.

29. The mediating server of claim 24 wherein the requested content is media content and the person making the requested content available for distribution is a person associated with a thing captured within the media content.

30. A central server for a centrally hosted content sharing network comprising:
   a communication interface communicatively coupling the central server to a plurality of user nodes via a network; and
   a control system associated with the communication interface and adapted to:
      receive a request for content from a requesting user node associated with a requesting user;
      select at least one content quality parameter for serving the request based on a social relationship of the requesting user and a person making the requested content available for distribution, the at least one content quality parameter defining a quality of the requested content to be transferred to the requesting network node and being selected from a group consisting of: an encoding algorithm used to encode the requested content, at least one encoding parameter, file size, resolution, color depth, and bit rate; and
      transfer the requested content to the requesting user node according to the at least one content quality parameter.

31. The central server of claim 30 wherein the control system is further adapted to select at least one Quality of Service (QoS) parameter.

32. The central server of claim 30 wherein the person making the requested content available for distribution is an owner of the content.

33. The central server of claim 30 wherein the requested content is media content and the person making the requested content available for distribution is a person captured within the media content.

34. The central server of claim 30 wherein the requested content is media content and the person making the requested content available for distribution is a person associated with a thing captured within the media content.

35. A method comprising:
   receiving, by a server, a request for a digital media item comprising a first digital resolution from a requesting network node associated with a requesting user;
   selecting, by the server, a content quality parameter for serving the request based on a social relationship of the requesting user and a person making the requested content available for distribution, the content quality parameter relating to a resolution quality of the digital media item;
   generating a new version of the digital media item comprising a second digital resolution that is a lower resolution than the first digital resolution based on the content quality parameter; and
   effecting transfer of the new version of the digital media item to the requesting user in response to the request.

* * * * *

UNITED STATES PATENT AND TRADEMARK OFFICE
CERTIFICATE OF CORRECTION

PATENT NO.       : 8,358,579 B1
APPLICATION NO.  : 11/466648
DATED            : January 22, 2013
INVENTOR(S)      : Richard J. Walsh et al.

It is certified that error appears in the above-identified patent and that said Letters Patent is hereby corrected as shown below:

On the Title Page

Item (73), change the Assignee's name from "Quiro" to --Qurio--

Signed and Sealed this
Nineteenth Day of February, 2013

Teresa Stanek Rea
*Acting Director of the United States Patent and Trademark Office*